US008565230B2

(12) United States Patent
Keesara et al.

(10) Patent No.: US 8,565,230 B2
(45) Date of Patent: Oct. 22, 2013

(54) SHARED VIRTUAL TUNNELS SUPPORTING MAC LEARNING IN COMMUNICATION NETWORKS

(75) Inventors: Srikanth Keesara, Tewksbury, MA (US); Sakthivadivu Saravanaraj, Nashua, NH (US); Liming Sun, Westford, MA (US); Roger Lapuh, Uesslingen (CH)

(73) Assignee: Avaya Inc., Basking Ridge, NJ (US)

( * ) Notice: Subject to any disclaimer, the term of this patent is extended or adjusted under 35 U.S.C. 154(b) by 192 days.

(21) Appl. No.: 12/916,730

(22) Filed: Nov. 1, 2010

(65) Prior Publication Data

US 2012/0063451 A1 Mar. 15, 2012

Related U.S. Application Data

(60) Provisional application No. 61/381,726, filed on Sep. 10, 2010.

(51) Int. Cl.
*H04L 12/00* (2006.01)

(52) U.S. Cl.
USPC ............ 370/389; 370/254; 370/401; 370/235

(58) Field of Classification Search
USPC .................. 370/389, 473, 474, 352–356, 349, 370/310.2, 328, 338, 312, 215–225, 401, 370/237, 238
See application file for complete search history.

(56) References Cited

U.S. PATENT DOCUMENTS

| 7,339,929 | B2 * | 3/2008 | Zelig et al. ................... 370/390 |
| 7,411,916 | B2 * | 8/2008 | Sakov et al. ................. 370/252 |
| 7,447,151 | B2 * | 11/2008 | McDysan ...................... 370/231 |
| 7,535,828 | B2 * | 5/2009 | Raszuk et al. ................ 370/219 |
| 7,782,841 | B2 * | 8/2010 | Rampal et al. ................ 370/352 |
| 7,969,978 | B2 * | 6/2011 | Napierala ...................... 370/389 |
| 7,995,500 | B2 * | 8/2011 | Vasseur ......................... 370/254 |
| 8,107,457 | B2 * | 1/2012 | White et al. .................. 370/350 |
| 8,125,928 | B2 * | 2/2012 | Mehta et al. .................. 370/254 |
| 2009/0274155 | A1 * | 11/2009 | Nakash .................... 370/395.53 |
| 2011/0299535 | A1 * | 12/2011 | Vobbilisetty et al. ......... 370/392 |
| 2012/0147740 | A1 * | 6/2012 | Nakash ......................... 370/221 |

* cited by examiner

*Primary Examiner* — Dang Ton
*Assistant Examiner* — Sai Aung
(74) *Attorney, Agent, or Firm* — Anderson Gorecki & Rouille LLP

(57) ABSTRACT

Embodiments herein include systems and methods for providing a mechanism for tunneled data transport within a dual homed access network. A tunnel manager, at a first network connectivity device in a transport network, identifies the transport network configured to interconnect at least two access networks for transporting data traffic between one or more end stations connected to the access networks. The first network connectivity device is coupled to a first access network. The tunnel manager identifies a second network connectivity device. The second network connectivity device is coupled to the first access network to provide the first access network dual homed access to the transport network via the first and second network connectivity devices. The tunnel manager creates a virtual tunnel that connects the first and second network connectivity devices to a third network connectivity device across the transport network. The virtual tunnel defines a same virtual tunnel having multiple paths such that the third network connectivity device learns a single virtual tunnel for device address learning.

20 Claims, 8 Drawing Sheets

SHARED VIRTUAL TUNNELS SUPPORTING MAC LEARNING IN COMMUNICATION NETWORKS

CROSS REFERENCE TO RELATED APPLICATIONS

The present application claims the benefit of U.S. Provisional Patent Application No. 61/381,726 filed on Sep. 10, 2010, entitled "Shared Virtual Tunnels Supporting Mac Learning In Communication Networks," which is incorporated herein by reference in its entirety.

BACKGROUND

The present disclosure relates to network computing. Computer networks typically include a collection of computing devices enabled to communicate with each other for handling data traffic and control instructions. For example, such devices can include servers, data centers, routers, network switches, management applications, wireless access points, and client computers. Computer networks can provide network connectivity to wired computing devices and/or wireless computing devices. Certain computer networks can provide an environment in which both wired and wireless users are supported by a same set of network switches.

Computer networks can include various configurations. One such configuration, known as a virtual private network (VPN), is a network that operates over a public communication network (such as the Internet) to provide remote offices or individual clients with secure, private access to a specific network, such as a network specific to an organization or company. VPNs function by encapsulating data transfers between two or more networked devices not on the same private network. Such encapsulation keeps transferred data private from other devices on one or more intervening local area networks or wide area networks. A VPN can enable a group of client computers to communicate and access specific resources as members of a given broadcast domain even if the various member client computers are not attached to the same network switch.

Network services, including VPN services are popularly provided using Ethernet technology. Ethernet has become a default Data Link Layer technology for data transport, that is, the default for Layer 2 (L2) of the Open Systems Interconnection (OSI) model. Ethernet technologies began as a Local Area Network (LAN) technology. Ethernet has since been extended to other networks. There are several accompanying technologies and protocols to assist with expanding Ethernet technologies to other or larger networks. One such protocol is that of Provider Backbone Bridges (PBB) or IEEE 802.1 ah. A network that uses IEEE 802.1 ah can route a customer network over a provider's network allowing interconnection of multiple Provider Bridge Networks without losing each customer's individually defined Virtual LANs (VLANs). Another such protocol is that of Shortest Path Bridging or IEEE 802.1aq. A network that uses IEEE 802.1 aq can advertise both topology and logical network membership. Packets are encapsulated at an edge either in Mac-in-Mac 802.1ah or Q-in-Q 802.1 ad frames and transported only to other members of the logical network. IEEE 802.1aq supports unicast and multicast, and all routing is on symmetric shortest paths. IEEE 802.1aq includes Shortest Path Bridging MAC (SPBM) functionality.

SUMMARY

VPNs can be structured using a transport network and an access network. The transport network is an intermediate network that connects two or more separate networks at its edge. These networks at the edge are also referred to as an access networks. An access network can connect the transport network with one or more end stations or client devices. VPN services commonly use Ethernet-based Layer 2 VPN (EVPN) services and technology. For EVPN services, the end user or end client source and destination Media Access Control (MAC) addresses are preserved or maintained. EVPN is a bridging service provided by a transport network that connects two or more Access Networks. The bridging service includes, among other things, functionality to forward data packets from one access network to another access network using the address information on a respective packet. The bridging service uses tunnels for data transport. A tunnel is a communication path and mechanism used between devices in a transport network. Tunnels function by encapsulating a data packet inside another data packet using header (and trailer) information. A tunnel is identified by a network address of the sender and receiver(s). P2P tunnels are tunnels with one sender and one receiver, while P2MP tunnels have one sender and multiple receivers. Accordingly, tunneled EVPN services use a transport network to tunnel data packets.

Access networks can be structured as single homed access or dual homed access. Single homing identifies an access network that connects to a single device (physical or logical) at the edge of a transport network. Dual homing identifies an access network that connects to at least a pair of transport devices (physical or logical). A dual homed edge then includes that pair of devices (switching devices) in the transport network that provide Dual Homing service to an access network, that is, the access network has a dual-homed connection to the transport network. Thus, dual homing is a mechanism by which a given access network connects to, and uses, a pair of devices in the transport network as if the given access network were connected to a single device. The two devices in the transport network exchange information between each other, which enables the pair of devices to present the access network to the rest of the transport network as if the access network was connected to a single device in the transport network. Failure of the connection of one of the paired transport devices to the access network, or even the complete failure of one of the transport devices, will not cause loss of connectivity between this given access network and any other access network. In other words, dual homed access provides redundancy, load balancing, and fault protection. Many networks used dual homed access networks. A dual homed access network is almost always used with important or priority networks. Such use is especially demanded with networks in which a failure of a transport device, even for a relatively small period, can result in significant losses.

EVPN dual homing uses dual homing as part of the EVPN bridging service, and typically includes a dual homed EVPN edge connected to an access network using EVPN Dual Homing. An end station, or client devices includes equipment that is connected to part of an access network that can send or receive data packets. EVPN tunneling uses MAC learning. When data packets from an end-station are received by a transport device providing EVPN services, the transport device remembers the port or the tunnel that that data packet was received on against the sender address that was used by the end-station. This is called MAC Learning. This addressing information is then subsequently used by the transport device when the transport device needs to forward data packets that bear the end-station address as the destination address.

Conventional mechanisms for providing an EVPN tunneled transport network have challenges. For example, each transport device, within a pair of transport devices, provides an EVPN tunnel to a third transport device. This third transport device is typically located within the EVPN transport network, and connected to a second access network. The third transport device can receive EVPN packets from one of two tunnels from either of the pair of transport devices. When end user/client MAC addresses are preserved, the third transport device learns a given MAC address as associated with, or tied to, one of the two EVPN tunnels. EVPN packets from a given end station can be transmitted via either transport tunnel. Typically, EVPN packets change tunnels frequently. Such changes in which tunnel is used for a given packet can be attributed to load balancing logic or other transport logic at the access network or pair of transport devices. Such a frequent change in path (tunnel selection) can cause problems for the transport device connected to the third access network. For example, each time an EVPN packet is received at the third transport device, the third transport device executes MAC learning. With packets being sent across both EVPN tunnels, the third EVPN device is constantly learning and relearning MAC addresses. This creates a lot of churning in the EVPN MAC learning process. Such churning increases a processing load at the transport device and can result in packet delays, packet loss, and even device failure.

Techniques disclosed herein include systems and methods for providing a mechanism to support address learning within a dual-homed access network. More specifically, the system uses shared virtual tunnels to support EVPN MAC learning with Dual Homed Access for EVPN Services in a network using IEEE 802.1ah and/or IEEE 802.1aq. The advantage of such techniques is that EVPN networks do not require redirection of traffic, which redirection would result in longer paths for the traffic in the network and higher latencies than without techniques disclosed herein. Using shared virtual tunnels, according to embodiments herein, can provide an EVPN transport device and network that does not restrict a type or make of access networks to which Dual Homing is supported, or that restricts the ability of corresponding devices and products to interoperate. The system can be used as part of an SPBM feature within network bridges, switches, routers, and multifunction transport devices.

In one embodiment a tunnel manager provides a method for packet switching and routing in a computer network that provides dual homed access. The tunnel manager identifies a transport network, the transport network includes switching devices that interconnect at least two separate access networks for transporting data traffic between end stations connected to the access networks. The transport network uses tunnels to encapsulate and transmit data packets between respective switching devices. The tunnel manager identifies a first switching device that connects a first access network to the transport network. The tunnel manager identifies a second switching device that also connects the first access network to the transport network. The first and second switching devices provide the first access network with a dual homed connection to the transport network. The tunnel manager creates a virtual tunnel that connects the first switching device to a third switching device within the transport network. This virtual tunnel also connects the second switching device to the third switching device within the transport network. The virtual tunnel defines a single virtualized source device address representing both the first switching device and the second switching device. In response to receiving a data packet from the first access network via the dual homed connection, the tunnel manager encapsulates the data packet with the single virtualized source device address and transmits the encapsulated data packet via the virtual tunnel to the third switching device.

In another embodiment, the tunnel manager identifies that the transport network includes the transport network supporting routing using multiple equal-cost paths. The tunnel manager can encapsulate data packets, received at the first switching device, by encapsulating the data packets with the single virtualized source device address and indicating a first routing path used by a forwarding plane of the third switching device. The tunnel manager can also encapsulate data packets, received at the second switching device, by encapsulating the data packets with the single virtualized source device address and indicating a second routing path used by a forwarding plane of the third switching device.

In another embodiment, the tunnel manager identifies, at a first network connectivity device, a transport network. This transport network is configured to interconnect at least two access networks for transporting data traffic between one or more end stations connected to the access networks. The first network connectivity device is coupled to a first access network. The tunnel manager identifies a second network connectivity device. The second network connectivity device is coupled to the first access network to provide the first access network dual homed access to the transport network via the first and second network connectivity devices. The tunnel manager creates a virtual tunnel that connects the first and second network connectivity devices to a third network connectivity device across the transport network. The virtual tunnel defines a same virtual tunnel that has multiple paths, such that the third network connectivity device learns a single virtual tunnel for device address learning.

Yet other embodiments herein include software programs to perform the steps and operations summarized above and disclosed in detail below. One such embodiment comprises a computer program product that has a computer-storage medium (e.g., a non-transitory, tangible computer readable storage media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: identifying a transport network, the transport network including switching devices that interconnect at least two separate access networks for transporting data traffic between end stations connected to the access networks, the transport network using tunnels to encapsulate and transmit data packets between respective switching devices; identifying a first switching device that connects a first access network to the transport network; identifying a second switching device that also connects the first access network to the transport network, the first and second switching devices providing the first access network with a dual homed connection to the transport network; creating a virtual tunnel that connects the first switching device to a third switching device within the transport network, the virtual tunnel also connecting the second switching device to the third switching device within the transport network, the virtual tunnel defining a single virtualized source device address representing both the first switching device and the second switching device; and in response to receiving a data packet from the first access network via the dual homed connection, encapsulating the data packet with the single virtualized source device address and transmitting the encapsulated data packet via the virtual tunnel to the third switching device. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Avaya, Inc. of Lincroft, N.J.

As discussed above, techniques herein are well suited for use in software applications supporting packet switching, routing, and data transport across a communication network. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

Techniques disclosed herein include systems and methods for providing a mechanism to support address learning within a dual-homed access network. More specifically, the system uses shared virtual tunnels to support EVPN MAC learning with Dual Homed Access for EVPN Services in a network using IEEE 802.1ah and/or IEEE 802.1 aq. The advantage of such techniques is that EVPN networks do not require redirection of traffic, which redirection would result in longer paths for the traffic in the network and higher latencies than without techniques disclosed herein. Using shared virtual tunnels, according to embodiments herein, can provide an EVPN transport device and network that does not restrict a type or make of access networks to which Dual Homing is supported, or that restricts the ability of corresponding devices and products to interoperate. The system can be used as part of an SPBM feature within network bridges, switches, routers, and multifunction transport devices.

In a network that uses tunneled transport for EVPN services, whenever data packets are sent from one edge device to another edge device, a tunnel that uniquely identifies the two edge devices is used. The MAC learning done at the receiving end of a tunnel assigns the End-Station MAC addresses of the data packets received on the tunnel to the corresponding Tunnel.

When tunnels are used in this manner to support Dual Homed Access Networks—it confuses the MAC learning process at the receiving end of the tunnel. The packets from an End-Station can arrive at the receiving end of a Tunnel on one of two possible tunnels in this case. With a continuous stream of packets being transported, this means that the MAC Learning process would constantly be switching the tunnel assigned to the MAC address of the End-Station addresses of packets received from a Dual Homed Access Network. This can cause both instability and loss of data packets at the Edge device that is receiving data packets from a Dual Homed Edge.

Figure 1:
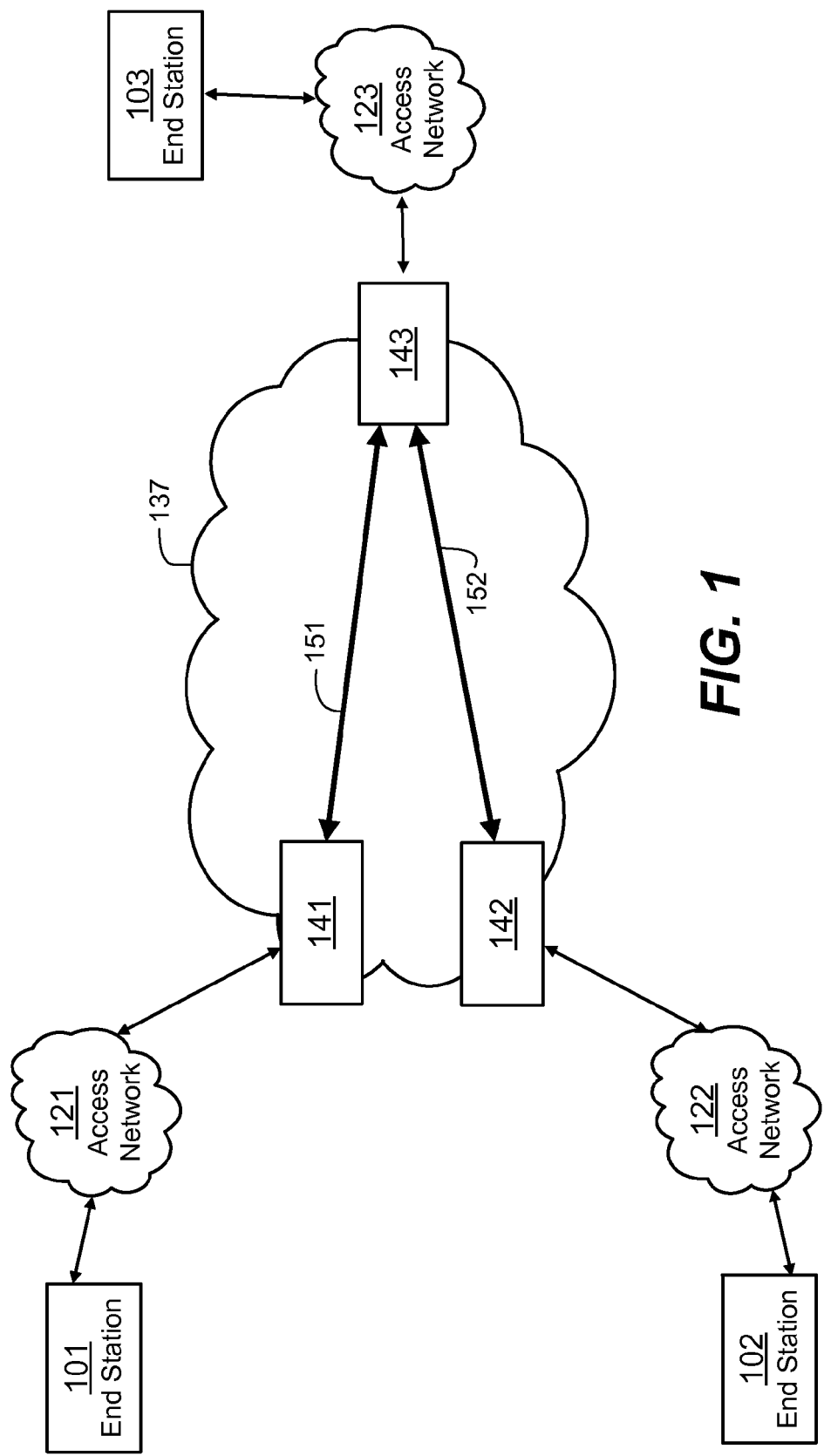
FIG. 1 is network diagram of a single homed access network.

FIG. 1 illustrates how tunnels are conventionally used in a transport network 137 used to support EVPN Services from a single homed access network. Access network 121 is a single-homed access network connected to edge node 141. Edge node 141 can interchangeably be referred to as transport device or switching device. Access network 122 is a single-homed access network connected to edge node 142. Access network 123 is a single-homed access network connected to edge node 143. Tunnel 151 is a transport tunnel between edge nodes 141 and 143. Tunnel 152 is a transport tunnel between edge nodes 142 and 143. Accordingly, edge node 141 uses tunnel 151 to send data packets from end station 101 to end station 103. Edge node 143 learns end station 101 against tunnel 151. Edge node 142 uses tunnel 152 to send data packets from end station 102 to end station 103. Edge node 142 then learn end station 102 against tunnel 152.

Figure 2:
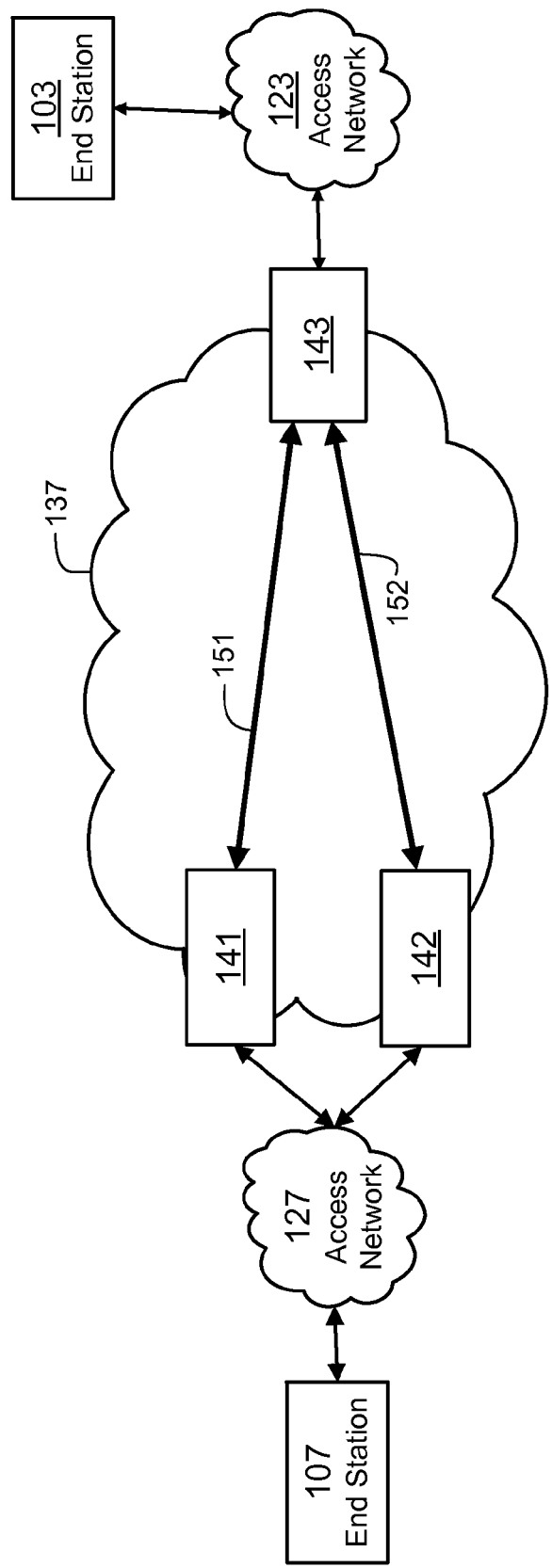
FIG. 2 is a network diagram of a dual homed access network.

FIG. 2. illustrates how tunnels are conventionally used in a dual-homed access network. Access network 127 is a dual-homed access network connected to dual-homed edge nodes 141 and 142. It is possible for data packets from end station 107, destined for end station 103, to arrive at either edge node 141 or 142 from access network 127. Edge node 141 uses tunnel 151 to send data packets from end station 107 to end station 103. Edge node 143 learns end station 107 against Tunnel 151. Edge node 142 uses tunnel 152 to send data packets from end station 107 to end station 103. Edge node 143 then learns end station 107 against tunnel 152. One problem is that when a stream of data packets is constantly sent from end station 107 to end station 103—some packets transported via edge node 141 and some packets via edge node 142—then edge node 143 never settles down and is instead constantly learning end station 107 by learning end station 107 sometimes on tunnel 151 and sometimes on tunnel 152. This can make edge node 143 unstable, and also has the potential to cause traffic loss. This causes a MAC learning problem when such conventional tunneling is used to support EVPN Dual Homing.

Figure 3:
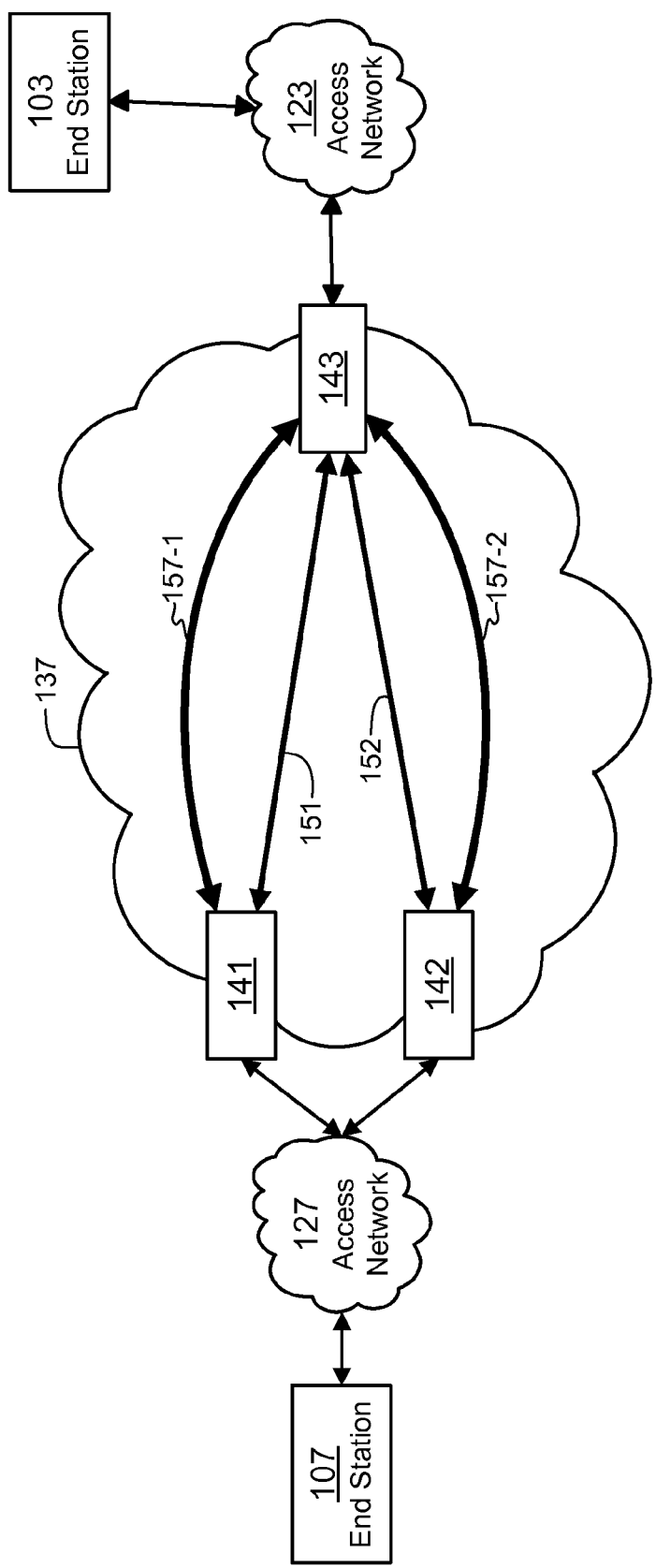
FIG. 3 is a network diagram of a dual homed access network according to embodiments herein.

FIG. 3 illustrates techniques for providing a stable dual homed access network by using shared virtual tunnels. A tunnel manager uses a virtual tunnel that is a shared virtual tunnel when transporting data packets from a dual-homed access network to another edge device in the transport network. Transport network 137 can provide data transport services including Layer 2 Ethernet connectivity between multiple sites. Any number of access networks can connect to transport network 137, but FIG. 3 is simplified for ease in understanding embodiments. Edge nodes 141, 142, and 143 are sites within a transport network where a customer network (access network) connects. Edge nodes can be physical devices, and there can be more than one device at each physical site. Logically, each edge node provides access to the access networks that connect with each edge node. This transport network and access network can alternatively be describes as a provider network and a customer network respectively. Access network 123 is singly attached to the transport network 137. Access network 127 is dually connected to transport network 137. The advantage of dual connection is redundancy in case one of the devices completely fails or if a connection breaks. Thus the primary purpose of the dual devices is to provide redundancy. A secondary purpose is handling excess capacity.

Transport network 137 can be generic. For example, transport network 137 can use Multiprotocol Label Switching (MPLS), bridge Layer 2 network, IP network, etc., or any other networking protocol that supports or uses tunnels (of various protocols) within the transport network to provide a data transport service. For example, transport network 137 can use Mac-in-Mac tunnels, Q-tunneling, etc. In other words, the edge nodes or switching devices, provide tunnels between sites so that actual customer datagrams are encapsulated within the tunnels and transported from one site to another through the core network.

A virtual address is an address that is used by more than one device in the network as a sender address, and is used by more than one device in the network to receive data frames bearing this address as the receiver address. Note that for any given data packet, in certain specific embodiments, one device in the network receives data frames using a virtual address as the destination address. The actual receiver in the case of virtual address as the destination depends on the path taken for the path in network. A virtual P2P tunnel is a tunnel that uses a virtual address as either the sender or the receiver address. The actual sender/receiver device is determined based on the path that is used in the network. This is possible in a network that supports equal cost paths for tunnels.

Edge device 141, from a network point of view, identifies data received from access network 127 as access network 127, without respect to multiple access points or end stations within access network 127. EVPN transport functions such that as traffic flows through a given edge node, other edge nodes need to learn the MAC addresses of traffic coming in from the corresponding access network. That is, as end stations access the transport network 137, receiving edge nodes need to learn a specific connection of end stations on a corresponding access network. Ethernet MAC learning functions by looking at an originated address on a packet to identify a source port, link, or tunnel, which can be an actual physical link or a logical tunnel. With such learning, the transport network knows which link to use for any subsequent traffic directed to end stations. In practice, to send data packets from end station 107 to end station 103, transport device 141 can determine to use tunnel 151 between transport device 141 and transport device 143, as basic MAC learning in an EVPN context. Each transport device can learn end stations as connected to a specific access network. Note that there can be several access networks connected to a given transport device. For clarity and understanding embodiments, the figures are simplified by showing a single access network connected to a given transport device.

Access network 127 includes end station 107. If end station 107 initiates transmission of a packet to end station 103, access network 127, having dual-homed access, can decide whether to transmit the packet via transport device 141 or transport device 142. In one example, access network 127 selects transport device 141 to transport the packet to end station 103. Consequently, transport devices 141 and 143 execute MAC address learning. Specifically, transport device 143 learns that end station 107 is accessed via a tunnel 151 from transport device 143 to transport device 141. In other words, transport device 143 learns that end station 107 is accessed via transport device 141, as if the connection came from a single-homed network. Access network 127, however, can split traffic between transport device 141 and transport device 142 depending on load balancing decisions. Thus once access network 127 transmits packets from end station 107 via transport device 142, upon receiving a corresponding data packet, transport device 143 determines that end station 107 has switched transport devices and is now using transport device 142. In other words transport device 143 relearns a location of 107. With a continuous stream of traffic from access network 127 that is continuously being load balanced using the dual-homed transport network devices or connections, there is continuous churning in the learning process at transport device 143. In other words the MAC address has not been stabilized, and so transport device 134 is constantly learning the MAC address against one transport device or another. Transport device 143 is then effectively constantly learning addresses between the two tunnels that connect transport device 141 and transport device 142 to transport device 143. Such continuous MAC learning at transport device 143 will cause instability. Such instability can cause high CPU spikes and disruption to traffic flows, out-of-sequence packets, and even loss of data. In other words, constantly changing forwarding tables at transport device 143 can be a disruptive operation.

The tunnel manager then implements or creates a virtual tunnel such that from the point of view of transport device 143, transport device 143 identifies a single virtual tunnel 157. This virtual tunnel 157 has two paths in the transport network 137. That is, transport device 143 identifies single tunnel with two possible paths. Upon receiving a packet from access network 127, that is, the dual-homed network, access network 127 select one of the paths in the virtual tunnel to send data packets to transport device 143. If access network 127 uses transport device 142, then transport device 142 would use the same virtual tunnel, but with a different path to send it to transport device 143. Transport device 143 will then simply learn the MAC address against the single virtual tunnel itself, and not necessarily the path used for sending data packets. Thus, transport device 143 recognizes end station 107 as being transmitted on a single virtual tunnel 157. Although transport device 143 recognizes two different paths (157-1 and 157-2), transport device 143 does not use paths as part of tunnel learning. Subsequently, when transport device 143 needs to send a message to end station 107, transport device 143 the automatically selects one of the two paths because this is not a learning decision, but simply a runtime decision executed by transport device 143. Transport device 143 is then not constantly MAC learning. When transport device 143 receives subsequent messages from end station 107 on different paths, transport device 143 does not relearn, but simply recognizes such transmissions as the same virtual tunnel 157. Such a technique effectively eliminates the churn happening at transport device 143 associated with EVPN MAC learning in this dual-homed scenario. Since transport network 137, or transport devices 141, 142, and 143 can provide multiple paths for a same tunnel, the tunnel manager then creates a virtual tunnel in which, from transport device 143, one path terminates on transport device 141 and another path terminates on transport device 142.

There are thus a total of three tunnels in FIG. 3. There is one tunnel 151 between transport device 141 and transport device 143, a second tunnel between transport device 142 and transport device 143, and transport devices 141 and 142 share a virtual tunnel between transport device 143. Tunnels 151 and 152 are dedicated tunnels, while the tunnel 157 is a virtual tunnel.

Figure 4:
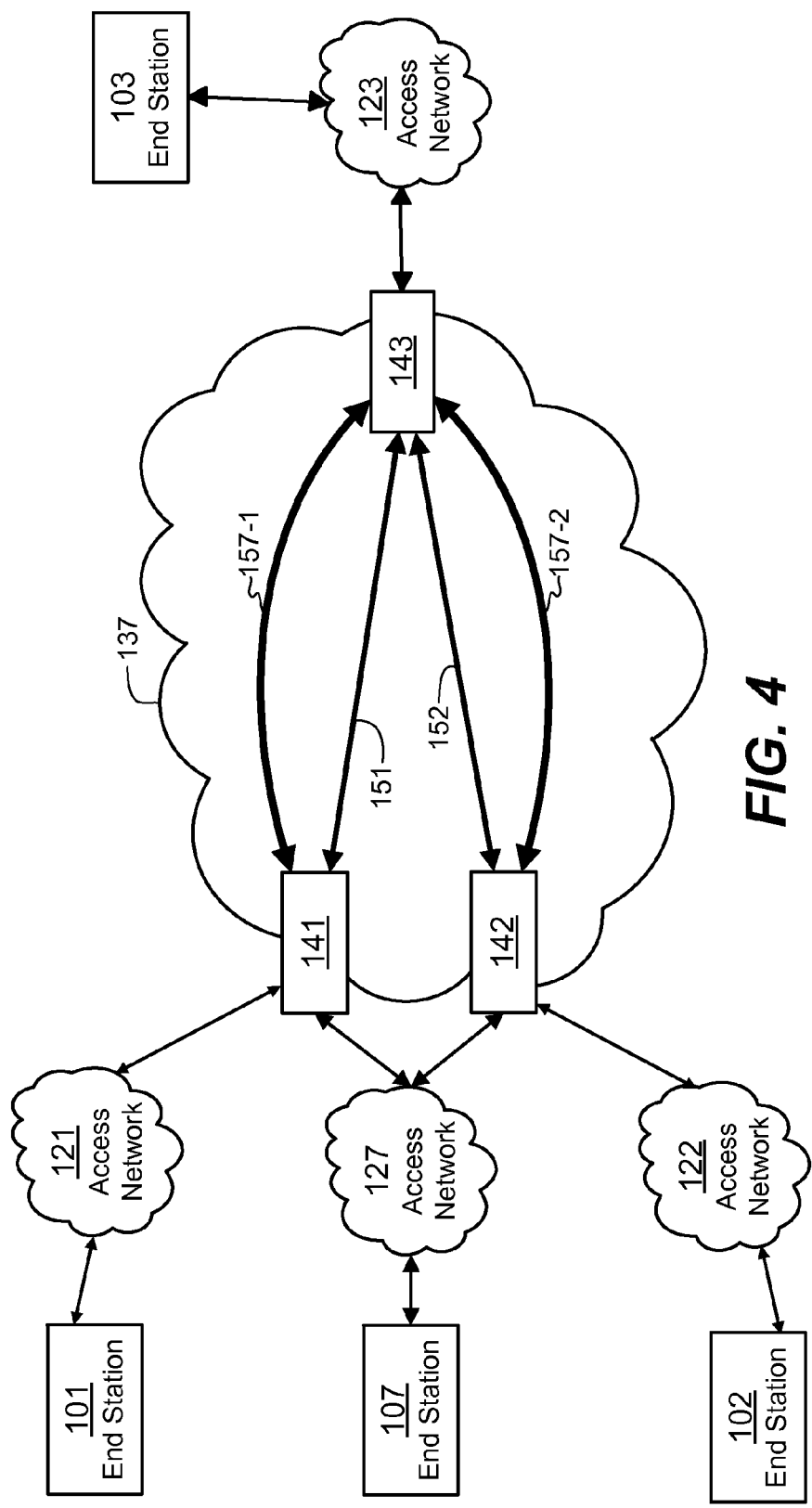
FIG. 4 is a network diagram of a dual homed access network according to embodiments herein.

Referring to FIG. 4, FIG. 4 illustrates shared virtual tunnels of FIG. 3 for a dual-homed connection, but with the addition of single homed-access networks 121 and 122 to show operation of the three tunnels. Thus, if transport device 141 receives data from single-homed access network 121, the transport device 141 uses dedicated tunnel 151 to transmit to transport device 143. When transport device 141, however, receives data from a dual homed connection, then transfer device 141 will use the shared virtual tunnel 157-1. Effectively, transport device 143 is identifies or learns a total of three possible tunnels. Such a technique prevents churning in the MAC tables, minimizes CPU loads, and constant table updates. Shared tunnel 157-1/157-2 virtualizes the address of transport devices 141 and 142.

The tunnel manager can establish virtual tunnel 157 differently within each transport device or type of transport network 137. Transport network 137 can be MPLS-based tunnels, MAC-in-MAC based tunnels, or conventional IP-based tunneling. A given transport network 137 can have a set of protocols and mechanisms that it uses to establish and maintain tunnels.

Conventional tunnel encapsulation protocols include a source address of a transport device, as the originator, and a destination address of a transport device, and some information depending on what kind of network is being used. In effect, transport device 143 identifies a source address of transport device 143. How addresses are presented in this form can vary depending on a type of transport network, for example an MPLS network can uses labels or IP addresses or predetermined control information. In a Layer 2 based transport network, or Ethernet-based transport network, the tunnel encapsulation header itself is another, additional, or extra Ethernet header. This additional Ethernet header can include transport devices 141 and 143 as the header addresses. Then the dedicated tunnel between transport device 142 and 143 would have transport device 142 and transport device 143 as the address.

The tunnel manager, when creating the virtual tunnel 157, then dedicates one more address called a shared virtual address for transport devices 141 and 142. Subsequently, both transport device 141 and transport device 142 use that shared virtual address. Transport device 143 recognizes tunnels 157-1 and 157-2 as one tunnel. Transport device 143 can distinguish between the shared virtual address and the two separate paths because the transport network 137 supports or is capable of supporting multiple equal cost paths in the network. Equal cost paths refers to two or more paths that could be taken by a tunnel between two points in the transport network. Within a tunnel header from the shared virtual tunnel is a path identifier. Tunnel manager identifies the shared address, and, for example, with transport device 142, will attach a path identifier such as path-2 for tunnel 157-2, while tunnel manager will attach a path identifier as path-1 for tunnel 157-1.

From a MAC learning perspective, the MAC learning does not analyze paths, but only addresses. Thus when transport device 143 receives a packet, transport device 143 identifies both a path identifier and an address, the virtual address, but when transport device 143 executes MAC learning it disregards the path identifier, and simply learns the packet against the MAC address identifier.

The tunnel manager can function within a packet routing network based on source and destination addresses of transport devices within a transport network that supports multiple routing paths. The tunnel manager then creates a third address, which both dual-homed transport devices use, but that has different path identifiers.

After virtual address learning at transport device 143, transport device 143 recognizes that, to send a return packet, transport device 143 must send this return packet via the virtual tunnel. Note that tunnels are typically bidirectional tunnels because transport devices use a same tunnel to send reverse direction traffic. In its forwarding plane, transport device 143 recognizes that there are two possible paths that the return packet could take, and at runtime transport device 143 makes a decision of which path to take. In other words, the paths are tied to the forwarding process, while the virtual tunnel address is tied to the learning process. Accordingly, the forwarding process can make a routing decision based on hardware or load balancing or other factors.

Embodiments herein can be used with a network that supports at least two tunnels to a shared address in the transport network. A dual-homed edge, for example (141,142), would together setup two paths for an address that is shared by both transport devices 141 and 142. These are referred to as two paths for a same shared Virtual Tunnel. Data packets received from the dual-homed edge are sent to other edge devices in the transport network using the shared virtual tunnel. Since the virtual tunnel is the same whether it originates at transport device 141 or 142, there is no confusion in the MAC learning process at the receiving end of the tunnel. The tunnel manager leverages the ability of a network to compute multiple paths for the same address to solve the problem of EVPN MAC learning with dual-homed access in a tunneled transport network. Embodiments can be used with IEEE802.1aq and/or IEEE802.1ah networks to provide access products supporting dual homing of EVPN services in an IEEE-802.1ah network.

Functionality associated with tunnel manager 140 will now be discussed via flowcharts and diagrams in FIG. 5 through FIG. 8. For purposes of the following discussion, the tunnel manager 140 or other appropriate entity performs steps in the flowcharts.

Figure 5:
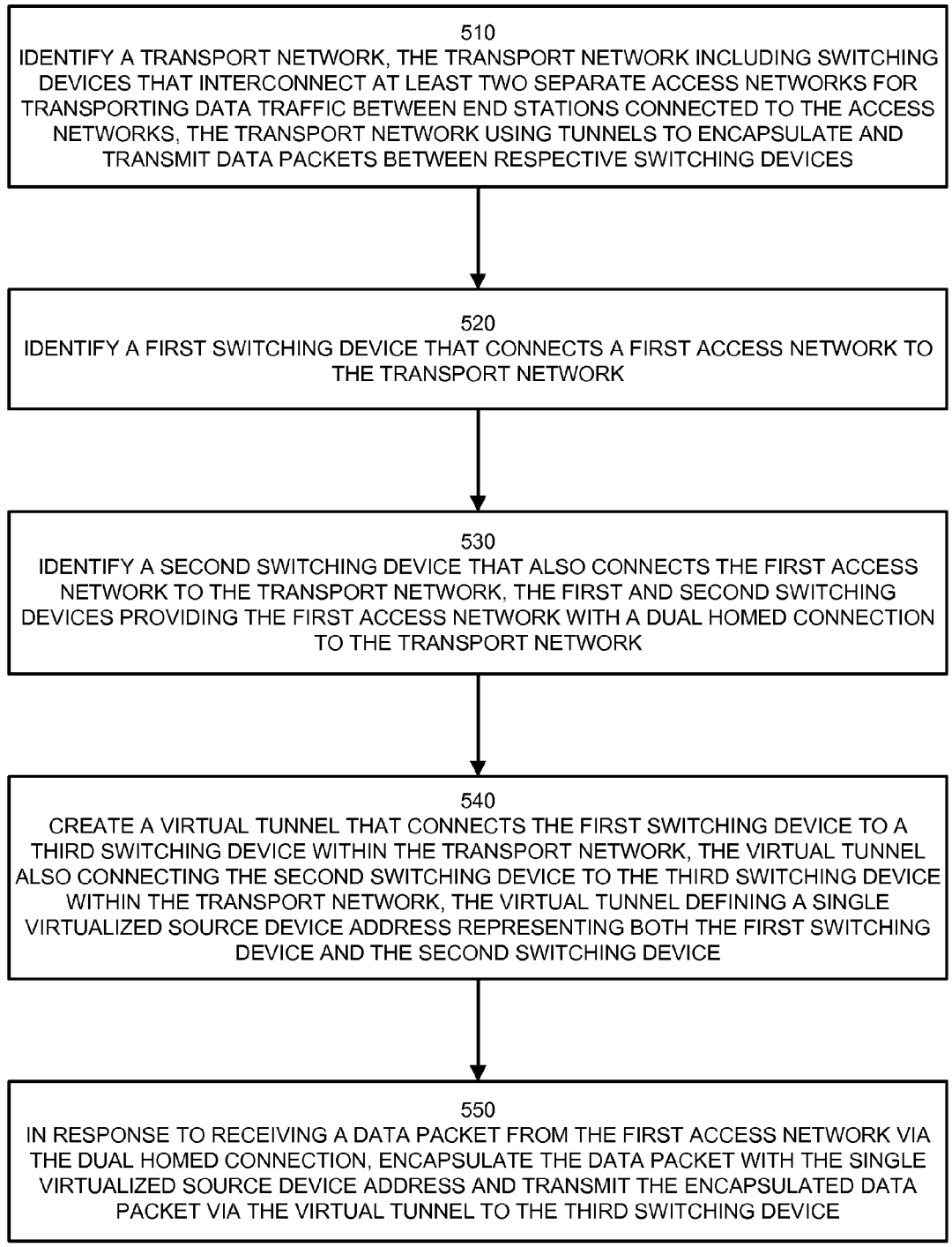
FIG. 5 is a flowchart illustrating an example of data transport according to embodiments herein.
Figure 6:
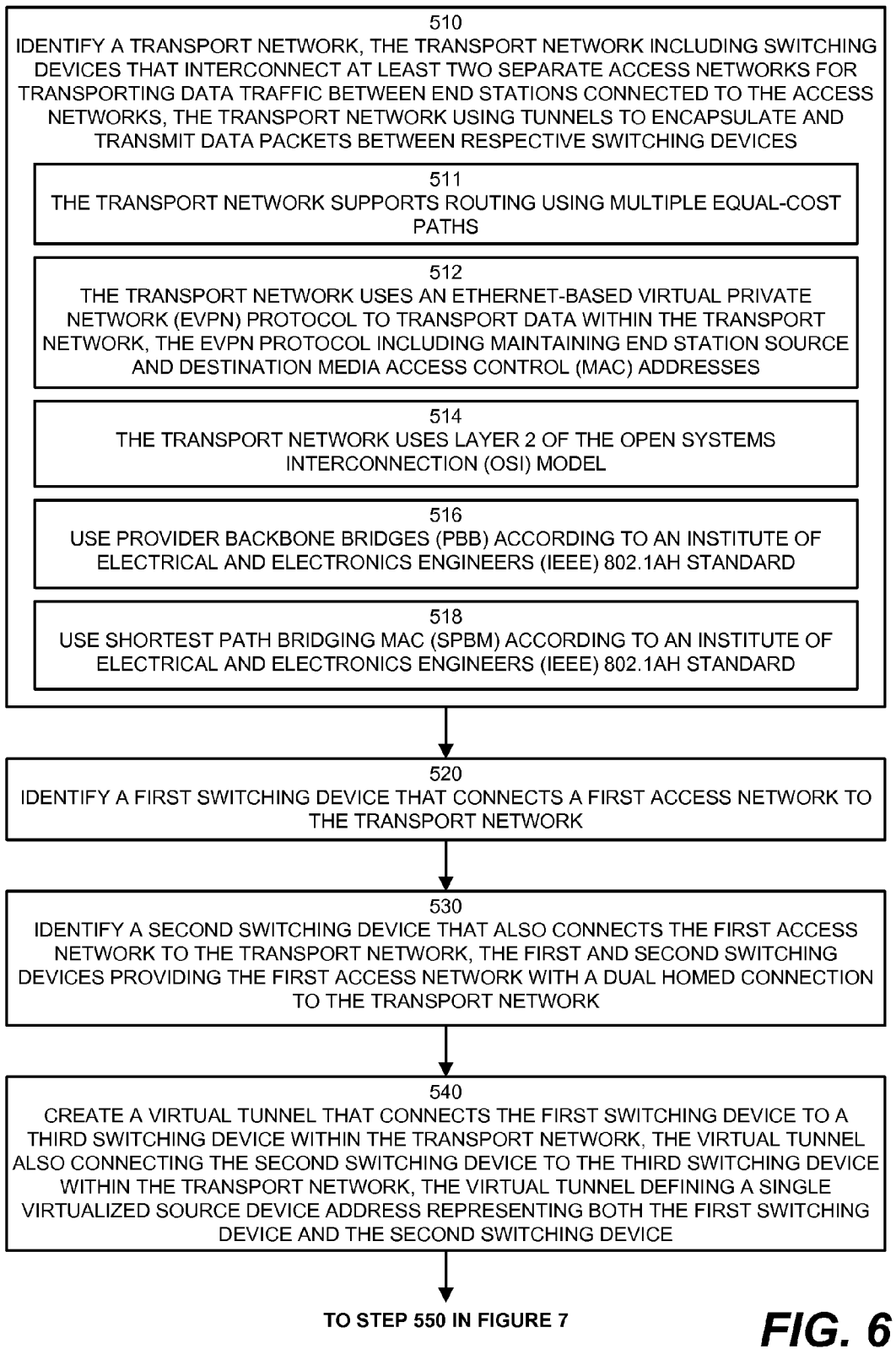
FIG. 6 is a flowchart illustrating an example of data transport according to embodiments herein.
Figure 7:
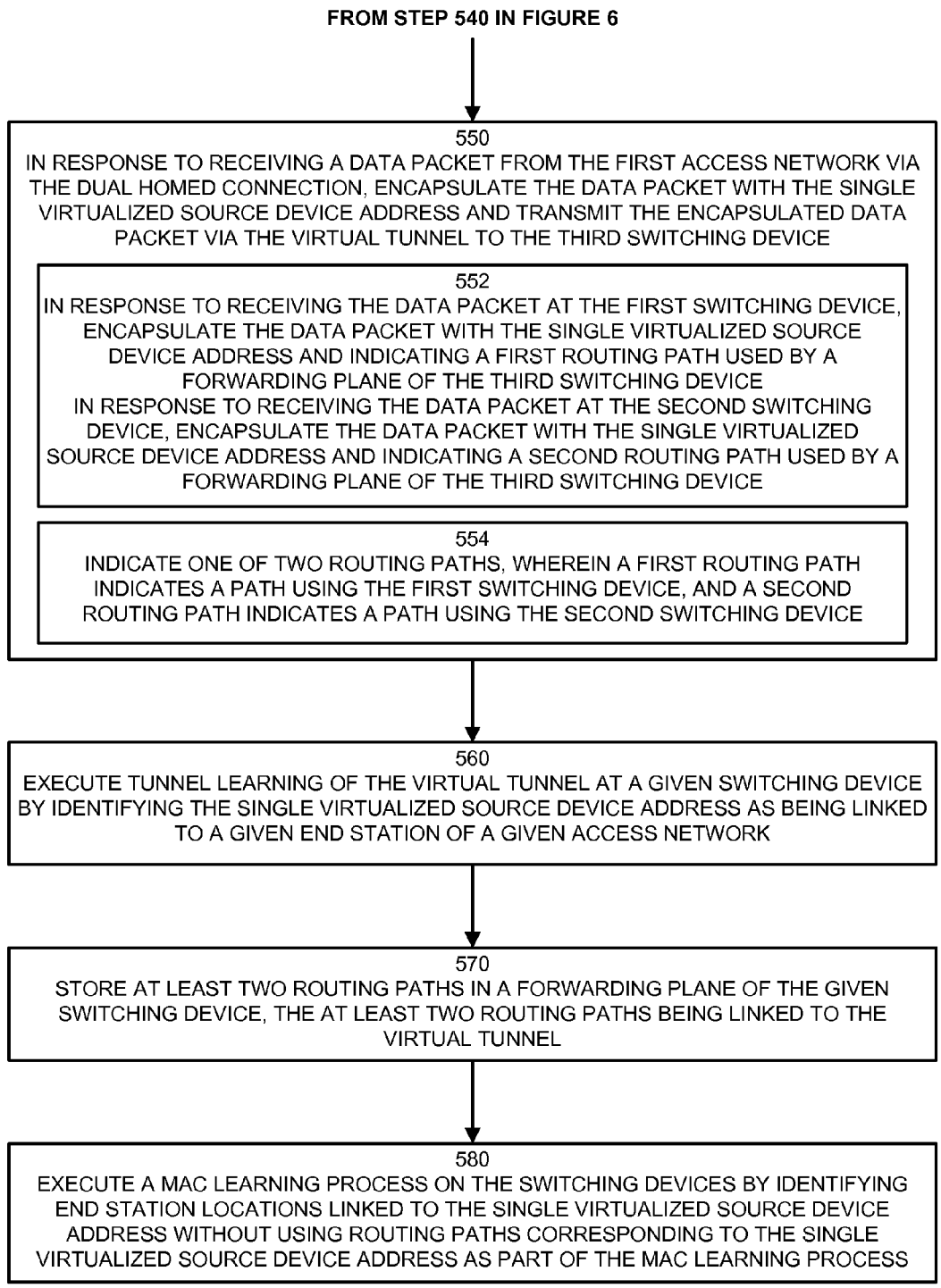
FIG. 7 is a flowchart illustrating an example of data transport according to embodiments herein.

Now describing embodiments more specifically, FIG. 5 is a flow chart illustrating embodiments disclosed herein.

In step 510, tunnel manager 140 identifies a transport network. The transport network includes switching devices that interconnect at least two separate access networks for transporting data traffic between end stations connected to the access networks. The switching devices can be edge nodes in a core network, or transport devices in a provider network. The transport network uses tunnels to encapsulate and transmit data packets between respective switching devices.

In step 520, tunnel manager 140 identifies a first switching device 141 that connects a first access network 127 to the transport network 137. In step 530, tunnel manager 140 identifies a second switching device 142 that also connects the first access network 127 to the transport network 137. The first and second switching devices 141 and 142 provide the first access network 127 with a dual homed connection to the transport network 137.

In step 540, tunnel manager 140 creates a virtual tunnel 157 that connects the first switching device 141 to a third switching device 143 within the transport network, the virtual tunnel 157 also connects the second switching device 142 to the third switching device 143 within the transport network, the virtual tunnel 157 defines a single virtualized source device address that represents both the first switching device 141 and the second switching device 142.

In step 550, in response to receiving a data packet from the first access network 127 via the dual homed connection, the tunnel manager 140 encapsulates the data packet with the single virtualized source device address and transmits the encapsulated data packet via the virtual tunnel 157 to the third switching device 143.

FIGS. 3-4 include a flow chart illustrating additional and/or alternative embodiments and optional functionality of the tunnel manager 140 as disclosed herein.

In step 510, tunnel manager 140 identifies a transport network. The transport network includes switching devices that interconnect at least two separate access networks for transporting data traffic between end stations connected to the access networks. The transport network uses tunnels to encapsulate and transmit data packets between respective switching devices.

In step 511, the transport network supports routing using multiple equal-cost paths.

In step 512, the transport network uses an Ethernet-based virtual private network (EVPN) protocol to transport data within the transport network. The EVPN protocol includes maintaining end station source and destination media access control (MAC) addresses.

In step 514, the transport network uses Layer 2 of the open systems interconnection (OSI) model, that is, the transport network 137 transmits data across the transport network according to protocols associated with Layer 2 of the OSI model.

In step 516, the transport network 137 uses provider backbone bridges (PBB) according to an Institute of Electrical and Electronics Engineers (IEEE) 802.1ah standard.

In step 518, the transport network 137 uses shortest path bridging MAC (SPBM) according to an Institute of Electrical and Electronics Engineers (IEEE) 802.1 ah standard.

In step 520, tunnel manager 140 identifies a first switching device 141 that connects a first access network 127 to the transport network 137.

In step 530, tunnel manager 140 identifies a second switching device 142 that also connects the first access network 127 to the transport network, the first and second switching devices 141 and 142 providing the first access network 127 with a dual homed connection to the transport network 137.

In step 540, tunnel manager 140 creates a virtual tunnel 157 that connects the first switching device 141 to a third switching device 143 within the transport network. The virtual tunnel 157 also connects the second switching device 142 to the third switching device 143 within the transport network 137. The virtual tunnel 157 defines a single virtualized source device address representing both the first switching device 141 and the second switching device 142. Virtual tunnel 157 can be created automatically, such as during initialization of a transport network, as switching devices are added to a network, or in response to any transport network change. Virtual tunnel 157 can also be manually created with a manually assigned virtualized address.

In step 550, in response to receiving a data packet from the first access network 137 via the dual homed connection, the tunnel manager 140 encapsulates the data packet with the single virtualized source device address and transmits the encapsulated data packet via the virtual tunnel 157 to the third switching device 143.

In step 552, in response to receiving the data packet at the first switching device 141, the tunnel manager 140 encapsulates the data packet with the single virtualized source device address and indicates a first routing path 157-1. This first routing path 157-1 is used by a forwarding plane of the third switching device 143. In response to receiving the data packet at the second switching device 142, the tunnel manager 140 encapsulates the data packet with the single virtualized source device address and indicates a second routing path 157-2 used by a forwarding plane of the third switching device 143.

In step 554, the tunnel manager 140 indicates one of two routing paths (157-1 or 157-2), wherein a first routing path indicates a path using the first switching device 141, and a second routing path indicates a path using the second switching device 142.

In step 560, the tunnel manager 140 executes tunnel learning of the virtual tunnel 157 at a given switching device by identifying the single virtualized source device address as being linked to a given end station of a given access network.

In step 570, the tunnel manager 140 stores at least two routing paths in a forwarding plane of the given switching device. The at least two routing paths being linked to the virtual tunnel 157.

In step 580, the tunnel manager 140, or given switching device, executes a MAC learning process on the switching devices by identifying end station locations linked to the single virtualized source device address without using routing paths corresponding to the single virtualized source device address, as part of the MAC learning process.

Figure 8:
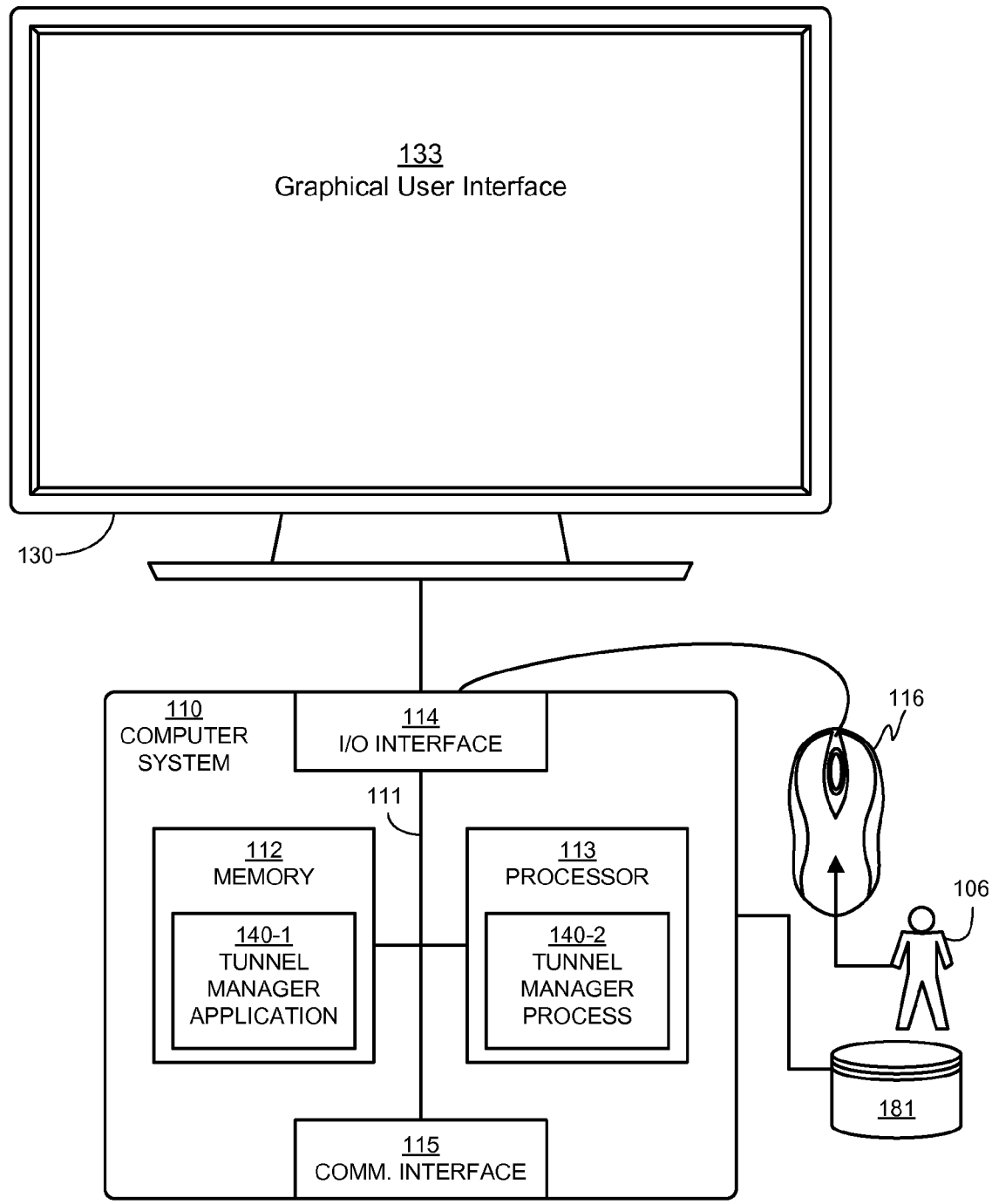
FIG. 8 is an example block diagram of a network transport device operating in a computer/network environment according to embodiments herein.

FIG. 8 shows an example physical embodiment according to techniques disclosed herein. In FIG. 8, computer system 110 is shown connected to display monitor 130 for displaying a graphical user interface 133 for a user 106 to use a tunnel manager 140 for processing data using input devices 116. In some embodiments, computer system 110 can execute tunnel manager 140 independent of user input, or in response to various inputs. Repository 181 can optionally be used for storing client data both before and after processing. Input devices 116 can include one or more devices such as a keyboard, computer mouse, etc.

Note that the following discussion provides a basic embodiment indicating how to carry out functionality associated with the tunnel manager 140 as discussed above and below. It should be noted, however, that the actual configuration for carrying out the tunnel manager 140 can vary depending on a respective application. For example, as previously discussed, computer system 110 can include one or multiple computers that carry out the processing as described herein.

In different embodiments, computer system 110 may be any of various types of devices, including, but not limited to, a network switch, a router, a wireless access point, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the tunnel manager 140 of computer system 110 to communicate over a network and, if necessary, retrieve any data required to create views, process content, communicate with a user, etc. according to embodiments herein.

As shown, memory system 112 is encoded with tunnel manager 140-1 that supports functionality as discussed above and as discussed further below. Tunnel manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the tunnel manager 140-1. Execution of the tunnel manager 140-1 produces processing functionality in tunnel manager process 140-2. In other words, the tunnel manager process 140-2 represents one or more portions of the tunnel manager 140 performing within or upon the processor 113 in the computer system 110.

It should be noted that, in addition to the tunnel manager process 140-2 that carries out method operations as discussed herein, other embodiments herein include the tunnel manager 140-1 itself (i.e., the un-executed or non-performing logic instructions and/or data). The tunnel manager 140-1 may be stored on a tangible (non-transitory) computer readable storage medium including computer readable storage media such as floppy disk, hard disk, optical medium, etc. According to other embodiments, the tunnel manager 140-1 can also be stored in a memory type system such as in firmware, read only memory (ROM), or, as in this example, as executable code within the memory system 112.

In addition to these embodiments, it should also be noted that other embodiments herein include the execution of the tunnel manager 140-1 in processor 113 as the tunnel manager process 140-2. Thus, those skilled in the art will understand that the computer system 110 can include other processes and/or software and hardware components, such as an operating system that controls allocation and use of hardware resources, or multiple processors.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A method for packet switching and routing in a computer network that provides dual homed access, the method comprising:
    identifying a transport network, the transport network including switching devices that interconnect at least two separate access networks for transporting data traffic between end stations connected to the access networks, the transport network using tunnels to encapsulate and transmit data packets between respective switching devices;
    identifying a first switching device that connects a first access network to the transport network;
    identifying a second switching device that also connects the first access network to the transport network, the first and second switching devices providing the first access network with a dual homed connection to the transport network;
    creating a shared virtual tunnel that connects the first switching device to a third switching device within the transport network, the shared virtual tunnel also connecting the second switching device to the third switching device within the transport network, the shared virtual tunnel defining a single virtualized source device address representing both the first switching device and the second switching device; and
    in response to receiving a data packet from the first access network via the dual homed connection, encapsulating the data packet with the single virtualized source device address and transmitting the encapsulated data packet via the shared virtual tunnel to the third switching device, and wherein said shared virtual tunnel extends from a first edge device and a second edge device in a dual-homed arrangement to a third edge device, wherein said first edge device comprises said first switching device, wherein said second edge device comprises said second switching device, and wherein said third edge device comprises said third switching device.

2. The method of claim 1, further comprising:
    wherein identifying the transport network includes the transport network supporting routing using multiple equal-cost paths;
    wherein encapsulating the data packet includes:
    in response to receiving the data packet at the first switching device, encapsulating the data packet with the single virtualized source device address and indicating a first routing path used by a forwarding plane of the third switching device; and
    in response to receiving the data packet at the second switching device, encapsulating the data packet with the single virtualized source device address and indicating a second routing path used by a forwarding plane of the third switching device.

3. The method of claim 2, further comprising:
executing tunnel learning of the virtual tunnel at a given switching device by identifying the single virtualized source device address as being linked to a given end station of a given access network; and
storing at least two routing paths in a forwarding plane of the given switching device, the at least two routing paths being linked to the virtual tunnel.

4. The method of claim 1, wherein identifying the transport network comprises the transport network using an Ethernet-based Virtual Private Network (EVPN) protocol to transport data within the transport network, the EVPN protocol including maintaining end station source and destination Media Access Control (MAC) addresses.

5. The method of claim 4, further comprising:
executing a MAC learning process on the switching devices by identifying end station locations linked to the single virtualized source device address without using routing paths corresponding to the single virtualized source device address as part of the MAC learning process.

6. The method of claim 1, further comprising:
wherein identifying the transport network comprises the transport network using Layer 2 of the Open Systems Interconnection (OSI) model; and
wherein encapsulating the data packet with the single virtualized source device address includes indicating one of two routing paths, wherein a first routing path indicates a path using the first switching device, and a second routing path indicates a path using the second switching device.

7. The method of claim 6, wherein the transport network includes using Shortest Path Bridging MAC (SPBM) according to an Institute of Electrical and Electronics Engineers (IEEE) 802.1ah standard.

8. A computer system comprising:
a memory;
a processor;
a communications interface;
an interconnection mechanism coupling the memory, the processor and the communications interface, the memory storing instructions that when executed by the processor cause the system to perform the operations of:
identifying a transport network, the transport network including switching devices that interconnect at least two separate access networks for transporting data traffic between end stations connected to the access networks, the transport network using tunnels to encapsulate and transmit data packets between respective switching devices;
identifying a first switching device that connects a first access network to the transport network;
identifying a second switching device that also connects the first access network to the transport network, the first and second switching devices providing the first access network with a dual homed connection to the transport network;
creating a shared virtual tunnel that connects the first switching device to a third switching device within the transport network, the shared virtual tunnel also connecting the second switching device to the third switching device within the transport network, the shared virtual tunnel defining a single virtualized source device address representing both the first switching device and the second switching device; and in response to receiving a data packet from the first access network via the dual homed connection, encapsulating the data packet with the single virtualized source device address and transmitting the encapsulated data packet via the shared virtual tunnel to the third switching device, and wherein said shared virtual tunnel extends from a first edge device and a second edge device in a dual-homed arrangement to a third edge device, wherein said first edge device comprises said first switching device, wherein said second edge device comprises said second switching device, and wherein said third edge device comprises said third switching device.

9. The computer system of claim 8, the memory storing further instructions comprising:
wherein identifying the transport network includes the transport network supporting routing using multiple equal-cost paths;
wherein encapsulating the data packet includes:
in response to receiving the data packet at the first switching device, encapsulating the data packet with the single virtualized source device address and indicating a first routing path used by a forwarding plane of the third switching device; and
in response to receiving the data packet at the second switching device, encapsulating the data packet with the single virtualized source device address and indicating a second routing path used by a forwarding plane of the third switching device.

10. The computer system of claim 9, the memory storing further instructions comprising:
executing tunnel learning of the virtual tunnel at a given switching device by identifying the single virtualized source device address as being linked to a given end station of a given access network; and
storing at least two routing paths in a forwarding plane of the given switching device, the at least two routing paths being linked to the virtual tunnel.

11. The computer system of claim 8, wherein identifying the transport network comprises the transport network using an Ethernet-based Virtual Private Network (EVPN) protocol to transport data within the transport network, the EVPN protocol including maintaining end station source and destination Media Access Control (MAC) addresses.

12. The computer system of claim 11, the memory storing further instructions comprising:
executing a MAC learning process on the switching devices by identifying end station locations linked to the single virtualized source device address without using routing paths corresponding to the single virtualized source device address as part of the MAC learning process.

13. The computer system of claim 8, the memory storing further instructions comprising:
wherein identifying the transport network comprises the transport network using Layer 2 of the Open Systems Interconnection (OSI) model; and
wherein encapsulating the data packet with the single virtualized source device address includes indicating one of two routing paths, wherein a first routing path indicates a path using the first switching device, and a second routing path indicates a path using the second switching device.

14. The computer system of claim 13, wherein the transport network includes using Shortest Path Bridging MAC (SPBM) according to an Institute of Electrical and Electronics Engineers (IEEE) 802.1ah standard.

15. A computer program product including a non-transitory computer-storage medium having instructions stored thereon for processing data information, such that the instructions, when carried out by a processing device, cause the processing device to perform the operations of:

identifying a transport network, the transport network including switching devices that interconnect at least two separate access networks for transporting data traffic between end stations connected to the access networks, the transport network using tunnels to encapsulate and transmit data packets between respective switching devices;

identifying a first switching device that connects a first access network to the transport network;

identifying a second switching device that also connects the first access network to the transport network, the first and second switching devices providing the first access network with a dual homed connection to the transport network;

creating a shared virtual tunnel that connects the first switching device to a third switching device within the transport network, the shared virtual tunnel also connecting the second switching device to the third switching device within the transport network, the shared virtual tunnel defining a single virtualized source device address representing both the first switching device and the second switching device; and in response to receiving a data packet from the first access network via the dual homed connection, encapsulating the data packet with the single virtualized source device address and transmitting the encapsulated data packet via the shared virtual tunnel to the third switching device, and wherein said shared virtual tunnel extends from a first edge device and a second edge device in a dual-homed arrangement to a third edge device, wherein said first edge device comprises said first switching device, wherein said second edge device comprises said second switching device, and wherein said third edge device comprises said third switching device.

16. The computer program product of claim 15, including further instructions stored thereon for processing data information, such that the further instructions, when carried out by a processing device, cause the processing device to perform the operations of:

wherein identifying the transport network includes the transport network supporting routing using multiple equal-cost paths;

wherein encapsulating the data packet includes:

in response to receiving the data packet at the first switching device, encapsulating the data packet with the single virtualized source device address and indicating a first routing path used by a forwarding plane of the third switching device; and in response to receiving the data packet at the second switching device, encapsulating the data packet with the single virtualized source device address and indicating a second routing path used by a forwarding plane of the third switching device.

17. The computer program product of claim 15, including further instructions stored thereon for processing data information, such that the further instructions, when carried out by a processing device, cause the processing device to perform the operations of:

wherein identifying the transport network comprises the transport network using an Ethernet-based Virtual Private Network (EVPN) protocol to transport data within the transport network, the EVPN protocol including maintaining end station source and destination Media Access Control (MAC) addresses;

wherein encapsulating the data packet with the single virtualized source device address includes indicating one of two routing paths, wherein a first routing path indicates a path using the first switching device, and a second routing path indicates a path using the second switching device; and executing a MAC learning process on the switching devices by identifying end station locations linked to the single virtualized source device address without using routing paths corresponding to the single virtualized source device address as part of the MAC learning process.

18. The method of claim 1 wherein said computer network uses Media Access Control (MAC) learning wherein the third switching device learns the single virtualized source device address for the shared virtual tunnel, the single virtualized source device address representing both the first switching device and the second switching device.

19. The computer system of claim 8 wherein said computer network uses Media Access Control (MAC) learning wherein the third switching device learns the single virtualized source device address for the shared virtual tunnel, the single virtualized source device address representing both the first switching device and the second switching device.

20. The computer program product of claim 15 wherein said computer network uses Media Access Control (MAC) learning wherein the third switching device learns the single virtualized source device address for the shared virtual tunnel, the single virtualized source device address representing both the first switching device and the second switching device.

* * * * *